March 7, 1933. F. W. GAY 1,900,496

NETWORK OF MID TAPPED TRANSFORMERS

Filed Dec. 16, 1930

INVENTOR

Frazer W. Gay

Patented Mar. 7, 1933

1,900,496

UNITED STATES PATENT OFFICE

FRAZER W. GAY, OF NEWARK, NEW JERSEY

NETWORK OF MID TAPPED TRANSFORMERS

Application filed December 16, 1930. Serial No. 502,735.

This invention relates to a novel method of controlling the output of a high capacity electrical supply station whereby very little impedance is offered to the normal expected flow of power from said substation, but a very great impedance is offered to the flow of power not in accordance with a predetermined plan.

Heretofore it has been customary to insert reactors in all lines leaving a high capacity bus for two reasons.

1st. To reduce the current that may flow to a short circuit to a value such that a circuit breaker of reasonable size and moderate cost may interrupt the flow of current to the short circuit.

2nd. To prevent so great a flow of current from the supply bus that the voltage of the supply bus will be reduced with the possibility that synchronous machines operating on said supply bus may be thrown out of step.

In my novel method of distribution I employ a plurality of mid tapped auto transformers having a very large and predetermined magnetizing current produced by either using a large air gap in the magnetic circuit or a magnetic circuit largely of non magnetic material. Several such auto transformers are employed in series.

The coils of the two halves of said auto transformers are well interlaced so that the drop in voltage on one half of the auto transformers is very little more than the rise in voltage on the other half.

In the preferred form of the invention a number of three phase feeders are grouped together on two three phase group busses. Each said group bus normally taking substantially the same amount of power from the power source and at substantially the same power factor. Each corresponding phase of these group busses receives its power from opposite ends of an individual one of a set of three auto transformers. These auto transformers each receive power at the mid points of the windings from a corresponding phase of the power system.

The exciting current taken by any auto transformer is so proportioned that the drop across the half winding that is carrying current to a fault is substantially equal to the drop in system voltage from the source of supply to its mid point, and since the drop in voltage in the one half of such an auto transformer is very little more than the rise in voltage of the other half, the utilization equipment connected to the non short circuited group bus receives substantially normal voltage during the fault.

In the preferred form of the invention shown in the drawing, two sets of mid tapped auto transformers are used connected in series relation, and the magnetic circuits are so designed that, for a three phase fault on one feeder, the current flowing to the fault through certain auto transformers will cause the voltage to fall to 75% of normal at the mid taps of the first transformers in the series. These first auto transformers will introduce a further drop of 25% in voltage to a fault current, so that approximately 50% voltage will be applied at the mid taps of the auto transformers next to the fault.

In general each set of auto transformers in the series through which the fault current passes receives fault current with a simultaneous incremental drop in voltage caused by the fault current, and each such set of auto transformers is designed to further drop the voltage of the fault current an equal increment, while it passes load current to the non short circuited side of its windings increased in voltage substantially the same incremental amount whereby the load circuits are maintained at normal voltage. Such a system of auto transformers in series constitutes in effect a net work in which incremental voltage drops caused by a fault current flowing to a fault at one load point in the net work are compensated by other incremental voltage rises whereby the voltage is maintained at substantially normal value at all load points other than the faulty load point.

An object of this invention is to provide a novel distribution system adapted to operate off a bus of great capacity and which transfers voltage from a short circuited feeder to non short circuited feeders whereby the current to the non short circuited feeder is maintained at a value within the rupturing capacity of circuit breakers of normal size and voltage is maintained on the non short circuited lines at substantially normal value.

A further object of this invention is to provide current limiting means adapted to greatly limit the current flowing to a faulty line at the time of a fault, while said means cooperate to introduce a minimum impedance to the flow of normal currents flowing in accordance with a predetermined plan.

Other objects of this invention not specifically described will be understood by referring to the drawing in which:—

Figure 1:
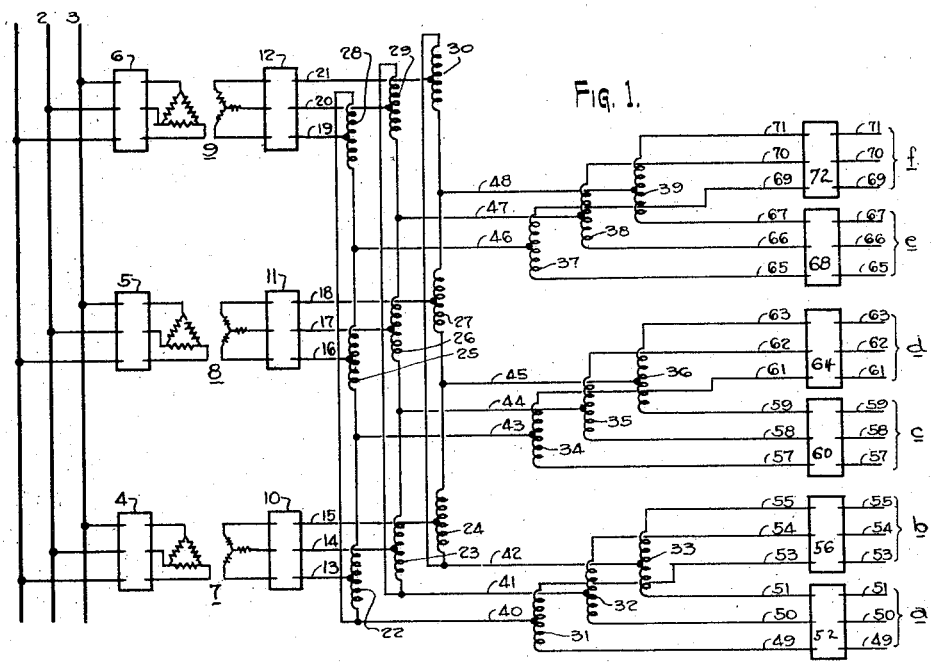
Figure 1 is a diagrammatic representation of six three phase feeders receiving power from a high capacity three phase station bus through a plurality of auto transformers.

Figure 1 shows a diagrammatic representation of a station bus of great capacity distributing power to six feeders, in which 1, 2, 3 represent the three phases of said bus. Three phase transformer banks 7, 8, 9 receive power from this bus through circuit breakers 4, 5, 6. The secondaries of these three transformer banks feed their induced power to the six feeders through circuit breakers 10, 11, 12. Three auto transformers 22, 23, and 24 receive power at their mid points from transformer bank 7 over wires 13, 14, and 15. Three auto transformers 25, 26, and 27 receive power at their mid points from transformer bank 8 over wires 16, 17, and 18. Three auto transformers 28, 29, and 30 receive power from transformer bank 9 over wires 19, 20, and 21. Auto transformers 22, 25, and 28 have their end terminals connected together to form a series circuit as 22 and 28 to lead 40; 22 and 25 to lead 43; and 25 and 28 to lead 46. Likewise the three auto transformers in another phase 23, 26, and 29 are connected to form a series circuit and their common points are connected to the leads 41, 44, and 47, and auto transformers 24, 27 and 30 are connected to form a series circuit and their common points are connected to the wires 42, 45, and 48. Wires 40, 41, and 42, which receive power jointly from transformer banks 7 and 9 through one half of auto transformers on the one hand 22, 23, 24 and on the other hand 28, 29, 30 are connected to the mid points of auto transformers 31, 32, and 33, respectively. In the same manner wires 43, 44, and 45 are connected to the mid points of auto transformers 34, 35, and 36, respectively. Wires 46, 47, and 48 are connected to the mid points of auto transformers 37, 38, and 39. Feeder wires 49, 50, and 51 connect the three phases of feeder $a$ to the terminals of one half of the windings of auto transformers 31, 32, and 33 through circuit breaker 52 and feeder wires 53, 54, and 55 connect the three phases of another feeder $b$ to the terminals of the other half of auto transformers 31, 32, and 33 through circuit breaker 56.

In the same manner feeder wires 57, 58, and 59 connect the three phases of a third feeder $c$ to the terminals of one half of the windings of auto transformers 34, 35, and 36 through circuit breaker 60 and feeder wires 61, 62, and 63 connect the three phases of a fourth feeder $d$ to the other halves of the windings of auto transformers 34, 35, and 36 through circuit breaker 64. In the same manner the three wires 65, 66, and 67 of a fifth feeder $e$ and the three wires 69, 70, 71 of a sixth feeder $f$ connect to the end windings of auto transformers 37, 38, and 39 through circuit breakers 68 and 72 respectively.

Figure 2:
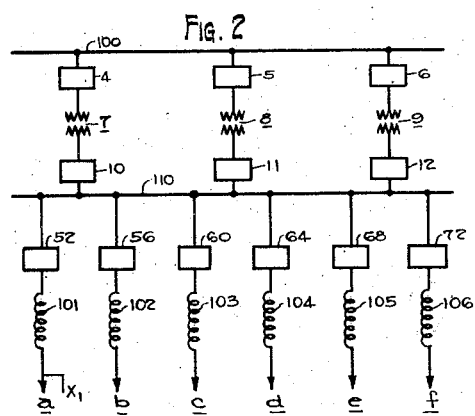
Figure 2 is a one line representation of six feeders receiving power from a high capacity station bus.

Figure 2 shows a one line diagram of a conventional substation in which 100 represents a high voltage bus of very great capacity; 7, 8, and 9 represent transformer banks each of 10,000 KVA capacity and each having a reactance at normal load of 10%. These may be considered as the same transformers shown in Figure 1. These three transformers are shown feeding their induced power to a low voltage bus represented by the line 110. Six feeders $a$, $b$, $c$, $d$, $e$, $f$ each of 5000 KVA capacity are represented by lines connected to bus 110 through circuit breakers 52, 56, 60, 64, 68, and 72. These may be considered the same feeders shown in Figure 1. 101, 102, 103, 104, 105, and 106 represent three phase, current limiting reactors in each feeder having a reactance drop of 8⅓% at a load of 5000 KVA.

A three phase fault is assumed to come on feeder $a$ as at X1. Each transformer bank has an assumed reactance of 10% at 10,000 KVA or 5% at 5000 KVA, and the three banks in multiple will have an impedance of 5/3 or 1⅔% at 5000 KVA. The total reactance from bus 100 to the fault will therefore be 1⅔ plus 8⅓ equals 10% and the KVA flowing to the fault (neglecting resistance effects) will therefore be 50,000 KVA.

The voltage on bus 110 i. e. the voltage on the other five feeders will be 100% less 10 times 1⅔% or approximately 83.5%.

Figure 3:
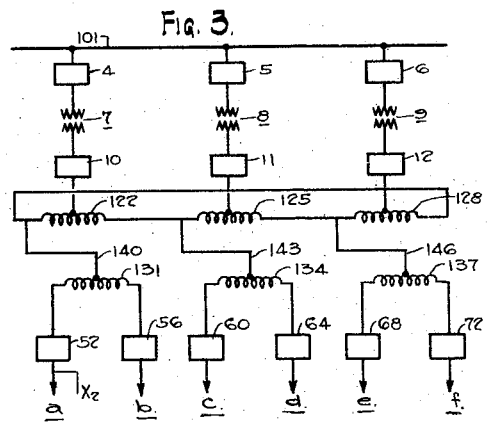
Figure 3 is a one line representation of the arrangement shown in Figure 1.

Figure 3 is a one line diagram of the arrangement shown in Figure 1 in which line 101 represents the three busses 1, 2, 3; 122 represents the three auto transformers 22, 23, and 24; 125 represents the three auto transformers 25, 26, 27; and 128 represents the three auto transformers 28, 29, and 30; 131 represents the three auto transformers 31, 32, and 33; 134 represents the three auto transformers 34, 35, and 36; and 137 represents the three auto transformers 37, 38, and 39.

The operation of this apparatus is as follows. If a three phase fault occurs say at X2 on feeder *a* and the apparatus is designed to limit the current to the fault to a value 10 times the normal feeder capacity, or 50,000 KVA as in the previous example, then this current will be drawn through the left hand windings of auto transformer 131 over wire 140 and substantially ½ or 25,000 KVA will be drawn through the left hand windings of auto transformer 122 and ½ or 25,000 KVA will be drawn through the right hand windings of auto transformer 128. One half (25,000 KVA) will thus come from bus 101 through transformer bank 7 and the other half (25,000 KVA) from bus 101 through transformer bank 9.

Since bank 7 and bank 9 each have 10% reactance to their rated load, i. e. 10,000 KVA they will each drop their voltage substantially 25% (neglecting resistance) when carrying 25,000 KVA at almost zero power factor provided, as we have assumed, the capacity of bus 101 is so great that its voltage is not materially reduced by the fault. It is proposed to design each of transformers 122, 125, 128 so that when one half of their respective windings carries 25,000 KVA, the drop across this half of said windings is 25%, i. e. the drop across this half of said windings is the same as the drop in the power circuit up to the mid point of these windings i. e. in this case 25%. It follows therefore that the voltage on wires 140 will be 50% of normal. One half of this 50% voltage drop will be in transformer banks 7 and 9 and one half of the drop will be in one half of the transformer windings 122 and 128. Now if the windings in the two halves of auto transformers 122 and 128 are closely interlaced there will be a rise in voltage induced in the right hand windings of transformers 122 substantially equal to the drop in the left hand windings, and there will be a voltage rise induced in the left hand windings of transformer 128 substantially equal to the drop in voltage in the right hand windings. It follows therefore that during the period of three phase fault at X2, the voltage on wires 140 and the connected ends of the windings of transformers 122 and 128 will be 50%. The voltage at the mid points of the windings of transformers 122 and 128 will be 75% of normal and the voltage on bus 101 will be 100%. The voltage on wires 143 and 146 and hence on feeders *c*, *d*, *e*, and *f* will be 100%. Substantially 100% voltage will therefore be maintained on all the feeders except the faulty feeder *a*.

It follows from the above that for very heavy loads even up to a short circuit on a single feeder, as feeder *a* in Figure 2 and feeder *a* Figure 3, the voltage regulation will be substantially the same whether protection is had by the conventional reactors of Figure 2 or by the auto transformers of the present invention Figure 3. However with a fault on *a*, Figure 2, feeders *b*, *c*, *d*, *e*, and *f* will be subject to a severe drop in voltage due to the fault, while feeders *b*, *c*, *d*, *e*, and *f*, Figure 3, will have substantially normal voltage maintained on them at the time of a fault on feeder *a*.

A study of Figure 2 will show that when reactors are permanently installed in series and all feeders are uniformly loaded at maximum capacity and at low power factor, there will be a voltage drop in reactors 101 to 106 inclusive of substantially 8⅓%, while if all feeders in Figure 3 are uniformly loaded at low power factor the drop in the auto transformers may be kept to less than 2% by closely interlacing the two halves of the windings.

As many changes could be made in the above construction and many apparently widely different embodiments of this invention could be made thereof, it is intended that all matter contained in the above description or shown in the accompanying drawing shall be interpreted as illustrative and not in a limiting sense.

What is claimed is:—

1. In a distribution system, in combination, a three phase source of power having three phase conductors, three auto-transformers having relatively low reactance to magnetizing current, each of said auto-transformers having its mid-tap connected to a respective one of said phase conductors for receiving power therefrom, and six additional auto-transformers, said additional auto-transformers having substantially twice as much reactance to magnetizing current as that possessed by said first named transformers, said additional auto-transformers having their mid-taps connected respectively to the respective winding terminals of said first-named auto-transformers.

2. In a distribution system, in combination, a three phase source of power having three phase conductors, three mid-tapped auto-transformers, each of said auto-transformers having its mid-tap connected to a respective one of said phase conductors for receiving power therefrom, two groups of additional mid-tapped auto-transformers, each of said groups of additional mid-tapped auto-transformers comprising three auto-transformers, each additional auto-transformer of one of said groups having its mid-tap connected to an end terminal of one of said first-named auto-transformers, and four substantially equal capacity load circuits, each of said load circuits being connected to three terminals of one of said second named groups of mid-tapped auto-transformers whereby upon the occurrence of a fault on one of said load circuits, voltage drops caused thereby are compensated for by said system of transformers to maintain substantially normal voltage on the non-faulty load circuits.

3. In a distribution system, in combination, a three phase source of power having three phase conductors, a plurality of three phase feeder circuits, a network of mid-tapped auto-transformers interconnecting said phase conductors to said feeder circuits, each of said auto-transformers having its mid-tap connected to a respective one of said phase conductors for receiving power and its end terminals connected to said feeder circuits, said auto-transformers offering relatively little impedance to the passage of power uniformly distributed among said feeder circuits but offering relatively great impedance to the passage of currents to a fault on one of said feeder circuits whereby voltage is maintained on the non-faulty feeder circuits.

4. In a distribution system, in combination, a three phase source of power having three phase conductors, a plurality of three phase feeder circuits, a network of mid-tapped auto-transformers, each of said auto-transformers having its mid-tap connected to a respective one of said phase conductors and serving to transmit power from its end terminals to said feeder circuits, said auto-transformers cooperating, upon the occurrence of a fault on one of said feeder circuits, to maintain normal voltage on the remaining feeder circuits.

5. In a distribution system, in combination, a three phase source of power having three phase conductors, a plurality of three phase feeder circuits, a network of mid-tapped auto-transformers, each of said auto-transformers in said system offering a reactance to a fault current flowing from its mid-tap to one terminal thereof, which reactance is substantially equal to the reactance of the system from the source of energy to the mid-tap of said transformer.

In testimony, that I claim the invention set forth above I have hereunto set my hand this 10th day of December, 1931.

FRAZER W. GAY.